United States Patent [19]

Kingston

[11] 4,229,980

[45] Oct. 28, 1980

[54] POWER TAKE-OFF

[76] Inventor: William Kingston, 47 Mespil Rd., Dublin 4, Ireland

[21] Appl. No.: 878,475

[22] Filed: Feb. 16, 1978

Related U.S. Application Data

[60] Division of Ser. No. 796,518, May 13, 1977, abandoned, which is a continuation-in-part of Ser. No. 659,229, Feb. 19, 1976, abandoned.

[51] Int. Cl.$^3$ ........................ F16H 37/00; F02N 1/00; F02N 7/00

[52] U.S. Cl. .................................... 74/15.63; 64/1 C; 74/6; 123/185 G; 123/195 A

[58] Field of Search ................... 74/15.63, 15.6, 6, 12; 123/185 G, 198 R, 179 SE, 179 P, 195 A; 64/1 C; 115/18 R

[56] References Cited

U.S. PATENT DOCUMENTS

| | | | |
|---|---|---|---|
| 1,738,772 | 12/1929 | Harry | 115/18 R |
| 2,549,480 | 4/1951 | Kiekhaefer | 115/18 R |
| 3,340,741 | 9/1967 | Pietro | 74/15.63 |
| 3,435,778 | 4/1969 | Ascuitto et al. | 74/15.63 |

*Primary Examiner*—Lloyd L. King

[57] ABSTRACT

A power take-off for a motor through a recoil starter mounted axially in relation to the flywheel. Operation of the recoil starter is not interfered with. Provision is also made for axial concentricity of drive and driven shafts when the power take-off is in use.

4 Claims, 1 Drawing Figure

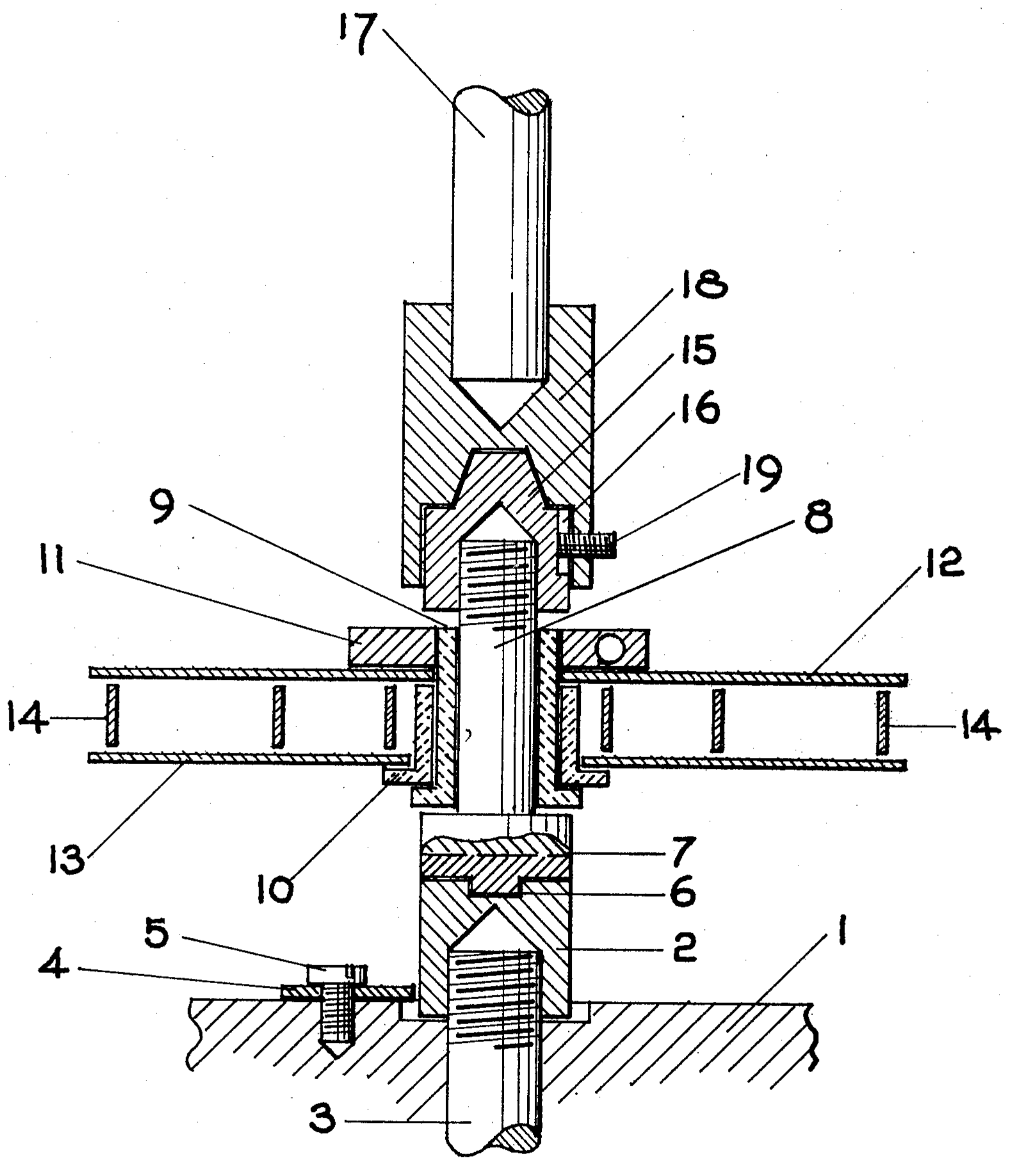
17
18
15
16
19
9
8
11
12
14
14
13
10
7
6
5
2
4
1
3

POWER TAKE-OFF

CROSS-REFERENCE TO RELATED APPLICATIONS

This is a division of my pending Application, Ser. No. 796,518 filed May 13, 1977, now abandoned, which is a continuation-in-part of my first earlier Application, Ser. No. 659,229, filed Feb. 19, 1976, now abandoned.

DESCRIPTION OF THE PRIOR ART

Small internal combustion engines of the type that are usually hand started, generally do not have a secondary power take-off capability, or substantial modification to the motor is required to add this.

SUMMARY OF THE INVENTION

The present invention provides an easy means of adding a power take-off to such a motor, by taking the drive through the recoil starter, which is generally mounted axially in relation to the flywheel.

BRIEF DESCRIPTION OF THE DRAWINGS

The accompanying FIGURE is a section of the preferred embodiment.

DESCRIPTION OF THE PREFERRED EMBODIMENT

With reference to the drawing, 1 is the flywheel of a motor, and 2 an axial extension to its main shaft 3, which replaces the flywheel retaining nut. 4 is a lock washer, held to flywheel 1 by set-screw 5 in one of the tapped holes for the flywheel puller. Washer 4 abuts a flat on the side of extension 2 so as to prevent this loosening under torque.

Extension 2 has a transverse groove 6 in its end to mate with the torque disc of flexible coupling 7. Connector shaft 8 similarly mates with the other side of coupling 7, and runs in flanged bushing 9 mounted within recoil starter spindle 10, and bushing 9 carries split collar 11. 12 is the cover plate and 13 is the sheave of the recoil starter, located relative to one another, and clamped together by spindle 10, bushing 9 and split collar 11. 14 indicates the coil spring of the recoil starter, wound around spindle 10.

The outer section of connector shaft 8 carries a cap with a male taper 15, outside a keyway 16. The shaft to be driven by the power take-off 17 carries a female sleeve 18 which is internally tapered corresponding to the taper on cap 15, and carries a pin 19 which mates with keyway 16.

Bushing 9 and collar 11 replace the nut and bolt which normally hold sheave 13 and cover plate 12 together. The bore of spindle 10 is generally small, so collar 11 is used instead of a nut to permit a larger diameter of shaft 8 than would be possible if bushing 9 had a wall thick enough to be threaded. The arrangement for linking shaft 8 and sleeve 9 ensures axial concentricity between the power take-off shaft and the driven shaft.

I claim:

1. A power take-off for a motor, comprising, in combination, an extension to an unmodified motor crankshaft, said extension arranged to penetrate a recoil starter mounted axially in relation to said flywheel, a spindle carrying the sheave of said starter, arranged to permit the passage of said extension therethrough, and locking means for preventing torque from separating said extension from said crankshaft, said locking means being independent of friction between said crankshaft and said extension.

2. A power take-off for a motor, comprising, in combination, an extension screwed to an unmodified motor crankshaft in place of the flywheel retaining nut, said extension arranged to penetrate a recoil starter mounted axially in relation to said flywheel, a spindle carrying the sheave of said starter, arranged to permit the passage of said extension therethrough, said spindle abutting the flywheel side of the cover plate of said starter, and means on the other side of said plate for fixing said spindle to said plate.

3. A power take-off as in claim 1, further incorporating means for preventing torque in the opposite direction to the crankshaft thread from unscrewing said extension.

4. A power take-off as in claims 1, 2, or 3 additionally incorporating means of connection to a driven shaft comprising a male part and a female part, each said part having two sections, each said section mating with the corresponding section of the other part, a first section adapted to prevent relative movement other than axial, and a second section adapted to achieve axial identity, between said parts when mated.

* * * * *